United States Patent
Laukemann et al.

(10) Patent No.: US 9,771,053 B2
(45) Date of Patent: Sep. 26, 2017

(54) HYDRODYNAMIC RETARDER

(71) Applicant: Voith Patent GmbH, Heidenheim (DE)

(72) Inventors: Dieter Laukemann, Crailsheim (DE); Alexander Martin, Kressberg (DE)

(73) Assignee: Voith Patent GmbH, Heidenheim (DE)

( * ) Notice: Subject to any disclaimer, the term of this patent is extended or adjusted under 35 U.S.C. 154(b) by 548 days.

(21) Appl. No.: 14/375,684

(22) PCT Filed: Jan. 11, 2013

(86) PCT No.: PCT/EP2013/050469
§ 371 (c)(1),
(2) Date: Oct. 9, 2014

(87) PCT Pub. No.: WO2013/113538
PCT Pub. Date: Aug. 8, 2013

(65) Prior Publication Data
US 2015/0075929 A1   Mar. 19, 2015

(30) Foreign Application Priority Data
Feb. 3, 2012 (DE) .................. 10 2012 002 039

(51) Int. Cl.
*B60T 1/087* (2006.01)
*F16D 57/04* (2006.01)
*B60T 10/02* (2006.01)

(52) U.S. Cl.
CPC .............. *B60T 1/087* (2013.01); *B60T 10/02* (2013.01); *F16D 57/04* (2013.01)

(58) Field of Classification Search
CPC .......... B60T 1/087; B60T 10/02; B60T 17/06; B60T 5/00; B22D 18/00; F16D 65/78;
(Continued)

(56) References Cited

U.S. PATENT DOCUMENTS 3,482,659 A   12/1969   Knapp
3,613,710 A   10/1971   Oberthur
(Continued)

FOREIGN PATENT DOCUMENTS

CN   201034130   3/2008
CN   201098563   8/2008
(Continued)

OTHER PUBLICATIONS

English Translation of PCT International Preliminary Report on Patentability dated Aug. 5, 2014 in PCT Application No. PCT/EP2013/050469.

*Primary Examiner* — Robert A Siconolfi
*Assistant Examiner* — San Aung
(74) *Attorney, Agent, or Firm* — Farjami & Farjami LLP

(57) ABSTRACT

There is provided a hydrodynamic retarder including a bladed rotor and a bladed stator jointly forming a working chamber to be filled with working medium and discharged therefrom, a working medium container receiving working medium, and a control pressure application system pressurizing the working medium with a control pressure medium to displace the working medium from the working medium container into the working chamber to set a desired braking torque. A centrifugal separator separating the working medium from the control pressure medium, the centrifugal separator is connected in a flow-conductive manner to an outlet of the working medium container for the control pressure medium to be pressurized with the control pressure medium, the centrifugal separator is driven by the pressure of the control pressure medium, and the working medium container is assembled from at least two shells, where the first and/or the second shell encloses the centrifugal separator.

19 Claims, 2 Drawing Sheets

(58) Field of Classification Search
CPC .......... F16D 57/00; F16D 57/04; F16D 33/18;
F16D 48/066; F16D 2300/021; F16D
2500/10487; F16H 41/30
USPC ............... 188/296; 192/216; 60/336, 337
See application file for complete search history.

(56) References Cited

U.S. PATENT DOCUMENTS

| | | | | |
|---|---|---|---|---|
| 6,227,221 | B1* | 5/2001 | Schmitz | F16D 31/02 |
| | | | | 137/1 |
| 2004/0238301 | A1* | 12/2004 | Kamossa | B60T 1/087 |
| | | | | 188/290 |
| 2005/0016804 | A1 | 1/2005 | Vogelsang | |
| 2005/0269177 | A1* | 12/2005 | Vogelsang | F01P 3/20 |
| | | | | 188/296 |
| 2007/0033931 | A1* | 2/2007 | Scherer | B60T 10/02 |
| | | | | 60/337 |
| 2007/0102251 | A1* | 5/2007 | Laukemann | B60T 10/02 |
| | | | | 188/296 |

FOREIGN PATENT DOCUMENTS

| | | |
|---|---|---|
| CN | 201100236 | 8/2008 |
| CN | 101903675 | 12/2010 |
| DE | 44 42 219 | 6/1995 |
| EP | 1 777 134 | 4/2007 |
| JP | 2003506634 | 2/2003 |
| WO | WO 2012003898 | 1/2012 |

* cited by examiner

HYDRODYNAMIC RETARDER

This is a U.S. national phase application, which is based on, and claims priority from, PCT application Serial No. PCT/EP2013/050469, filed Jan. 11, 2013, which claims priority from foreign application Serial No. 10 2012 002 039.2, filed Feb. 3, 2012, in Germany.

The present invention relates to a hydrodynamic retarder, in particular according to the preamble of claim 1.

Hydrodynamic retarders comprise a working chamber which can be filled with a working medium and is discharged thereof in order to transmit a torque from a bladed primary wheel, which is also known as the rotor, to a secondary wheel, which is also known as the stator. In the case of a filled working chamber, the primary wheel is retarded and thus a shaft which is especially arranged in a torsion-proof manner with the primary wheel, e.g. a universal shaft or a transmission output shaft which is indirectly connected to the wheels of a vehicle.

For the purpose of setting a specific degree of filling in the working chamber of the hydrodynamic retarder and thus for setting the braking torque, a superimposed pressure is applied to the working medium, especially oil which is stored in a working medium.

Since the control pressure medium such as air usually exerts a pressure directly on the liquid level, it comes into contact with the working medium. The control pressure medium absorbs small droplets of the working medium. When the hydrodynamic retarder is switched off, the control pressure is reduced and the control pressure medium is diverted out of the working medium container. In order to prevent a discharge of working medium entrained by the control pressure medium and thus a decrease in the working medium volume in the working medium container over time, the working medium must be separated from the control pressure medium.

Oil separators with porous structures are conventionally used for this purpose, through which the mixture of control pressure medium and working medium is conducted. A relatively high pressure of the control pressure medium is necessary for this purpose, which requires additional energy input. It is a further disadvantage of such oil separators that they are susceptible to soiling due to the porous structure. Accumulating dirt produces clogging of the porous structures, thereby decreasing the separation rate and increasing the pressure loss. A necessary regular exchange or cleaning of the structure leads to increased maintenance work of a hydrodynamic retarder with such a control pressure application system.

It is therefore the object of the present invention to provide a hydrodynamic retarder which avoids the disadvantages of the state of the art. In particular, a hydrodynamic retarder with a control pressure application system shall be provided which is insensitive to soiling, offers low maintenance and whose control pressure application system shows low pressure losses.

A hydrodynamic retarder in accordance with the invention comprises a bladed rotor and a bladed stator, which jointly form a working chamber which can be filled with what emptied of a working medium, and a working medium container for receiving working medium which is not currently located in the working chamber. It further comprises a control pressure application system for applying a control pressure medium to the working medium contained in the working medium container, so that more or less working medium is displaced out of the working medium container into the working chamber in order to set a desired braking torque.

In accordance with the invention, a centrifugal separator is provided for separating working medium from the control pressure medium, more precisely for separating working medium from the mixture of control pressure medium and working medium. The centrifugal separator is connected in a flow-conductive manner to a working medium container outlet for the control pressure medium so as to be pressurised with the control pressure medium, and the centrifugal separator is driven by the pressure of the control pressure medium.

The inventors have thus found an exceptionally simple and effective separation of the working medium from the control pressure medium. The centrifugal separator is pressurised by the "spent air" during the deactivation of the hydrodynamic retarder and thus the withdrawal of the control pressure medium. The control pressure medium, more particularly the mixture of control pressure medium and working medium which flows after the decrease of the control pressure from the working medium container, is used as a driving flow for the centrifugal separator. As a result, no additional auxiliary power is necessary because the pressure difference which occurs anyway via the working medium container is used for operating the centrifugal separator. As a result of its configuration and functionality, i.e. the separation according to the centrifugal principle, the latter is insensitive to soiling and is substantially maintenance-free.

According to one embodiment, the centrifugal separator comprises two inlet cylinders which are switched successively in the direction of flow of the control pressure medium and comprise one respective control pressure medium inlet for supplying control pressure medium to the inlet cylinders and a control pressure medium outlet for discharging control pressure medium therefrom, wherein the control pressure medium outlet of the first inlet cylinder which receives the first flow from the control pressure medium is connected in a flow-conductive manner to the control pressure medium inlet of the second inlet cylinder which is situated downstream of the first inlet cylinder and the control pressure medium outlet of the second inlet cylinder to the outlet of the working medium container. This produces a two-step separation of the working medium from the mixture between the control pressure medium and the working medium. It is obvious that more than two inlet cylinders switched in series are possible.

The centrifugal separator is advantageously arranged above a liquid level of the working medium of the working medium container which is partly filled with control pressure medium and partly with working medium. The centrifugal separator can preferably be arranged at the highest location in the working medium container or also outside the working medium container on its housing. The air heats up by direct contact of the control pressure medium such as air with the working medium such as oil which heats up during operation of the retarder, as a result of which the air is capable of receiving more working medium in droplet form. Optimal cooling of the mixture between control pressure medium and working medium is achieved by arranging the centrifugal separator as far away as possible from the hot working medium, in combination with a separation of the working medium by its condensation. In particular, a comparatively low temperature of the walls of the inlet cylinders on which the mixture flows leads to a high condensation rate, which in addition to the separation by centrifugal force improves the separation rate.

The invention will now be explained in closer detail by reference to an embodiment and the enclosed drawings, wherein.

Figure 1:
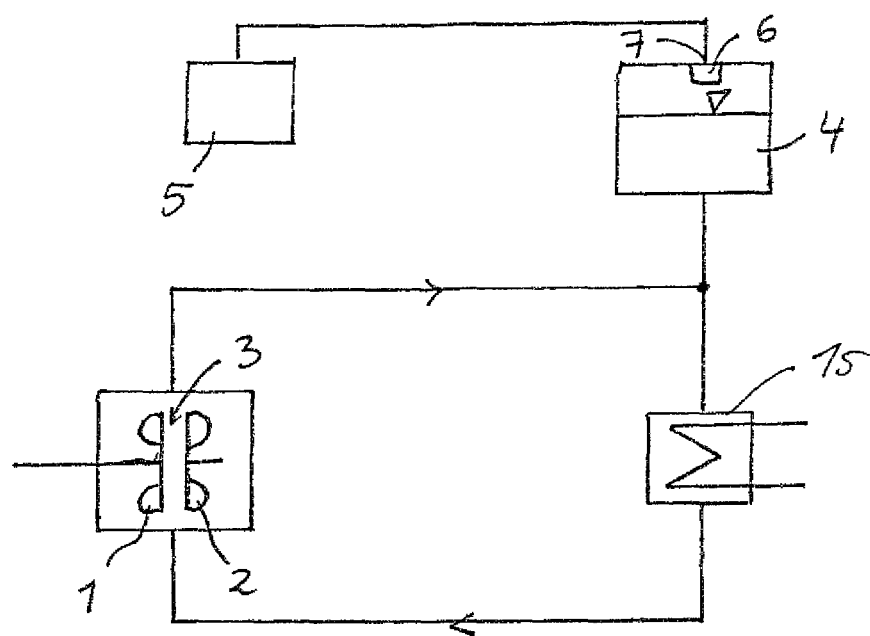
FIG. 1 shows a schematic representation of a hydrodynamic retarder arranged in a cooling circuit.

FIG. 1 shows a schematic representation of a hydrodynamic retarder arranged in a cooling circuit. The latter comprises a bladed and revolving primary wheel, which is designated here as rotor 1, and a stationary, non-revolving and also bladed secondary wheel, which is designated here as stator 2. Rotor 1 and stator 2 jointly form a working chamber 3 which is toroidal in this case. Furthermore, a working medium container 4 is provided for storing working medium that is currently not situated in the working chamber 3. The working medium container 4 is connected in this case via an inlet to the cooling circuit, as seen in the direction of flow of the working medium, wherein the inlet is situated downstream of the hydrodynamic retarder. A heat exchanger 15 is provided in the present case in the direction of flow behind the inlet, which heat exchanger is arranged for example as an oil-water heat exchanger and is used for dissipating the heat quantity that is produced in operation of the hydrodynamic retarder in the working medium. The cooling circuit, the retarder and the exchanger 15 could preferably be combined into a single compact modular unit and preferably housed in a common housing.

The working chamber 3 can be filled via a working medium which circulates in the cooling circuit and can be discharged therefrom. The filling of the working chamber 3 occurs by the application of a pressurized control pressure medium on the working medium situated in the working medium container 4. The discharging occurs by withdrawing said pressure application. The working medium container 4 is partly filled with working medium such as oil and partly with control pressure medium such as air, so that a liquid level of the working medium separates the control pressure medium side from the working medium side. A (single) flow-conductive connection is provided between the working medium container 4 and a control pressure application system 5 for applying pressure to the liquid level. The flow-conductive connection forms an inlet and simultaneously an outlet 7 for the control pressure medium which flows into or out of the working medium container 4.

A further connecting line which is arranged in parallel to the flow-conductive connection could also be provided between the control pressure application system 5 and the working medium container 4. In this case, the connecting line would be used for applying pressure, i.e. for supplying control pressure medium from the control pressure medium application system 5 via an inlet to the working medium container 4 and the flow-conductive connection for discharging the control pressure medium from the working medium container 4 via the outlet 7.

As is shown in FIG. 1, a centrifugal separator 6 is arranged in the region of the outlet 7 of the working medium container 4. The latter could also be arranged outside of the working medium container 4, e.g. on its outer wall. The centrifugal separator 6 is used for separating working medium from the control pressure medium, particularly from a mixture between control pressure medium and working medium obtained in operation of the hydrodynamic retarder in the working medium container 4. Since the centrifugal separator 6 is arranged in the region of the outlet 7, the centrifugal separator 6 can receive the flow from the control pressure medium and be subjected to pressure especially exclusively during the discharge of control pressure medium from the working medium container 4, as a result of the pressure difference that occurs by reducing the application of pressure.

A bypass can also be assigned to the centrifugal separator 6 for bypassing the same. A nonreturn valve can be provided upstream of the centrifugal separator 6 in the bypass as seen in the direction of flow of the control pressure medium towards the control pressure application system 5. Such a nonreturn valve allows the control pressure medium to pass through by bypassing the centrifugal separator, which control pressure medium flows from the control pressure medium application system in the direction towards the working medium containing 4 within the terms of pressurizing the same. In an opposite direction of flow however, it would completely automatically seal the flow cross-section in the bypass, so that the control pressure medium would have to flow through the centrifugal separator 6 for separating the working medium. Such a bypass can preferably be used in cases where only one single flow-conductive connection is provided between the control pressure application system 5 and the working medium container 4 for the selective pressurization and ventilation of the same with control pressure medium. This ensures that only control pressure medium flowing from the working medium container 4 in the direction towards the control pressure application system 5 will pass the centrifugal separator 6, but not vice versa.

Figure 2A:
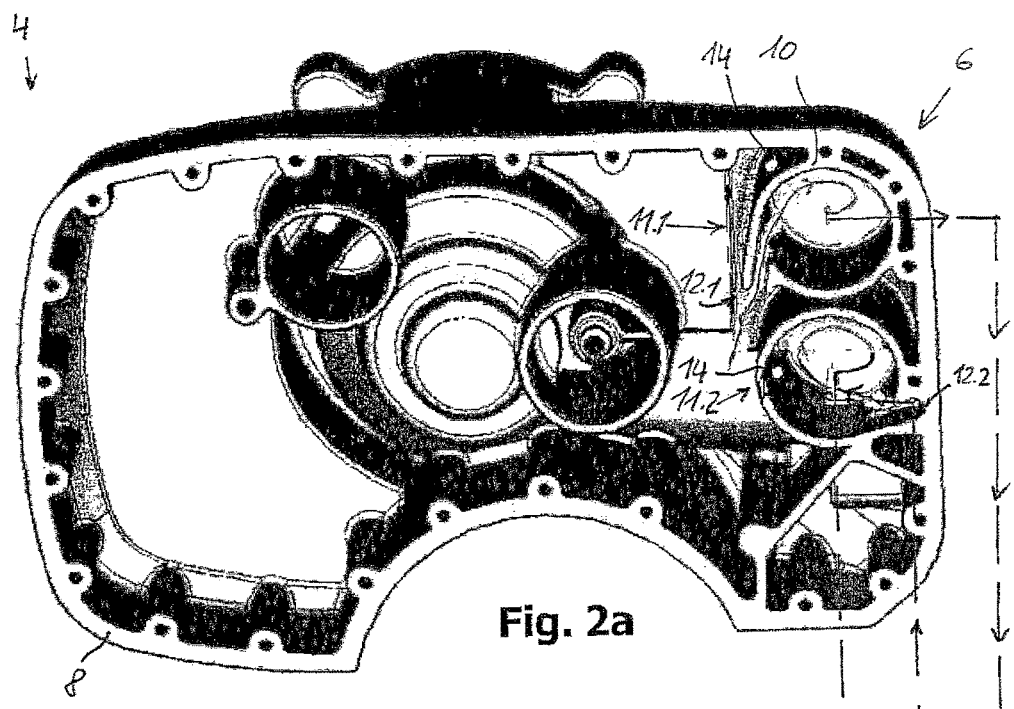
FIG. 2 shows a preferred embodiment of a working medium container of the hydrodynamic retarder with a centrifugal separator.
Figure 2B:
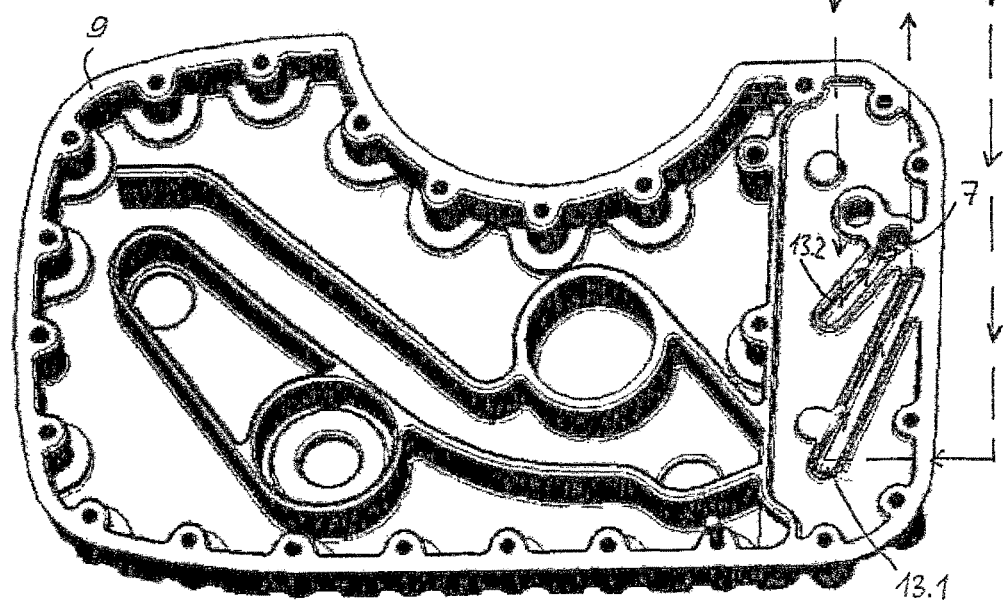

FIG. 2 shows a preferred embodiment of a working medium container 4 of the hydrodynamic retarder in an exploded view. In the present case, the working medium container 4 is assembled by two shells 8, 9. It is obvious that a number of shells that deviates therefrom is also possible, e.g. three. In the present case, the first shell 8 completely encloses the centrifugal separator 6. The latter is formed by a wall 10 which extends in an annular manner at least in sections and which respectively delimits an inlet cylinder 11.1, 11.2. The cylinder axis of the respective inlet cylinder 11.1, 11.2 stands substantially perpendicularly to an inside surface of the first shell 8 facing the second shell 9. In this case, the wall 10 of the respective inlet cylinder 11.1, 11.2 is arranged integrally with the first shell 8. It could also be different however. The wall 10 could also be formed by the second shell 9 alone or even by both shells 8, 9 jointly. The wall 10 could be inserted alternatively as a single part into one or both of the shells 8, 9.

Each inlet cylinder 11.1, 11.2 respectively comprises a control pressure medium inlet 12.1, 12.2, which is connected to the control pressure medium side of the working medium container 4 and is used for supplying control pressure medium to the respective inlet cylinder 11.1, 11.2. Furthermore, each inlet cylinder 11.1, 11.2 is also assigned a control pressure medium outlet 13.1, 13.2 for discharging control pressure medium therefrom. Both control pressure medium inlets 12.1, 12.2 are arranged in the region of a separating plane of the two shells 8, 9, are formed by an annular gap of the wall 10 or together with the wall of one or both shells 8, 9, and extend virtually tangentially on the wall of the respective inlet cylinder 11.1, 11.2.

The illustration shows that the two inlet cylinders 11.1, 11.2 are switched in succession in the direction of flow of the control pressure medium that flows through the same. When the control pressure medium is withdrawn, the mixture between control pressure medium and working medium which leaves the working medium container 4, more particularly the control pressure medium side, flows through the control pressure medium inlet 12.1 into the inlet cylinder 11.1 where it is accelerated radially to the outside and is separated by the centrifugal force of the working medium. The latter can flow via at least one opening 14 in the wall 10 back to the working medium container 4. The control pressure medium, which is separated from the working medium, then flows further to the control pressure medium outlet 13.1 of the first inlet cylinder 11.1. It is located in the region of the cylinder axis of the inlet cylinder element 11.1, in this case at the axial end of the inlet cylinder 11.1 facing the second shell 9. It flows from there by a flow-conductive connection in the second shell 9 to the control pressure medium inlet 12.2 of the second inlet cylinder 11.2, where it is accelerated radially to the outside, so that working medium still contained in the control pressure medium can be separated fully or up to a low residual quantity. The working medium which is separated in the second inlet cylinder 11.2 acting as the second separating stage can exit via the opening 14 indicated by way of example from the inlet cylinder 11.2 in order to flow into the working medium container 4.

As a result of the driving pressure difference between the control pressure application system 5 and the working medium container 4, the control pressure medium is "conveyed" again along the cylinder axis to the axial end of the inlet cylinder 11.2 facing the second shell 9 and from there via the control pressure medium outlet 13.2 of the second inlet cylinder 11.2 to the outlet 7 of the working medium container 4, from where it flows back to the control pressure application system 5 (FIG. 1).

LIST OF REFERENCE NUMERALS

1 Rotor
2 Stator
3 Working chamber
4 Working medium container
5 Control pressure application system
6 Centrifugal separator
7 Outlet
8, 9 Shell
10 Wall
11.1, 11.2 Inlet cylinder
12.1, 12.2 Control pressure inlet
13.1, 13.2 Control pressure outlet
14 Opening
15 Heat exchanger

The invention claimed is:

1. A hydrodynamic retarder comprising:
a bladed rotor and a bladed stator jointly forming a working chamber configured to be filled with working medium and to be discharged therefrom;
a working medium container for receiving working medium that is currently not situated in the working chamber;
a control pressure application system for pressurizing the working medium contained in the working medium container with a control pressure medium to displace the working medium from the working medium container into the working chamber in order to set a desired braking torque;
wherein a centrifugal separator is provided for separating the working medium from the control pressure medium, wherein the centrifugal separator is connected in a flow-conductive manner to an outlet of the working medium container for the control pressure medium so as to be pressurized with the control pressure medium, wherein the centrifugal separator is driven by the pressure of the control pressure medium and wherein the working medium container is assembled from at least two shells, wherein the first and/or the second shell encloses the centrifugal separator.

2. A hydrodynamic retarder comprising:
a bladed rotor and a bladed stator jointly forming a working chamber configured to be filled with working medium and to be discharged therefrom;
a working medium container for receiving working medium that is currently not situated in the working chamber;
a control pressure application system for pressurizing the working medium contained in the working medium container with a control pressure medium to displace the working medium from the working medium container into the working chamber in order to set a desired braking torque;
wherein a centrifugal separator is provided for separating the working medium from the control pressure medium, wherein the centrifugal separator is connected in a flow-conductive manner to an outlet of the working medium container for the control pressure medium so as to be pressurized with the control pressure medium, wherein the centrifugal separator is driven by the pressure of the control pressure medium, and wherein the centrifugal separator comprises at least one inlet cylinder delimited by a wall extending in an annular fashion at least in sections and whose cylinder axis stands substantially perpendicularly to an inner surface of the first shell facing the second shell.

3. The hydrodynamic retarder according to claim 1, wherein the centrifugal separator comprises at least one inlet cylinder delimited by a wall extending in an annular fashion at least in sections and whose cylinder axis stands substantially perpendicularly to an inner surface of the first shell facing the second shell.

4. The hydrodynamic retarder according to claim 2, wherein the wall of the inlet cylinder is integral with the first and/or second shell.

5. The hydrodynamic retarder according to claim 3, wherein the wall of the inlet cylinder is integral with the first and/or second shell.

6. The hydrodynamic retarder according to claim 2, wherein the centrifugal separator comprises two inlet cylinders which are switched in succession in the direction of flow of the control pressure medium and respectively comprise a control pressure medium inlet for supplying control pressure medium to the inlet cylinder and a control pressure medium outlet for discharging control pressure medium therefrom, wherein the control pressure medium outlet of the first inlet cylinder is connected in a flow-conductive manner to the control pressure medium inlet of the second inlet cylinder and the control pressure medium outlet of the second inlet cylinder to the outlet of the working medium container.

7. The hydrodynamic retarder according to claim 3, wherein the centrifugal separator comprises two inlet cylinders which are switched in succession in the direction of flow of the control pressure medium and respectively comprise a control pressure medium inlet for supplying control pressure medium to the inlet cylinder and a control pressure medium outlet for discharging control pressure medium therefrom, wherein the control pressure medium outlet of the first inlet cylinder is connected in a flow-conductive manner to the control pressure medium inlet of the second inlet cylinder and the control pressure medium outlet of the second inlet cylinder to the outlet of the working medium container.

8. The hydrodynamic retarder according to claim 4, wherein the centrifugal separator comprises two inlet cylinders which are switched in succession in the direction of flow of the control pressure medium and respectively comprise a control pressure medium inlet for supplying control pressure medium to the inlet cylinder and a control pressure medium outlet for discharging control pressure medium therefrom, wherein the control pressure medium outlet of the first inlet cylinder is connected in a flow-conductive manner to the control pressure medium inlet of the second inlet cylinder and the control pressure medium outlet of the second inlet cylinder to the outlet of the working medium container.

9. The hydrodynamic retarder according to claim 5, wherein the centrifugal separator comprises two inlet cylinders which are switched in succession in the direction of flow of the control pressure medium and respectively comprise a control pressure medium inlet for supplying control pressure medium to the inlet cylinder and a control pressure medium outlet for discharging control pressure medium therefrom, wherein the control pressure medium outlet of the first inlet cylinder is connected in a flow-conductive manner to the control pressure medium inlet of the second inlet cylinder and the control pressure medium outlet of the second inlet cylinder to the outlet of the working medium container.

10. The hydrodynamic retarder according to claim 6, wherein the flow-conductive connection is respectively formed by the first and/or second shell.

11. The hydrodynamic retarder according to claim 7, wherein the flow-conductive connection is respectively formed by the first and/or second shell.

12. The hydrodynamic retarder according to claim 8, wherein the flow-conductive connection is respectively formed by the first and/or second shell.

13. The hydrodynamic retarder according to claim 9, wherein the flow-conductive connection is respectively formed by the first and/or second shell.

14. The hydrodynamic retarder according to claim 2, wherein the wall comprises at least one opening in order to discharge working medium from the inlet cylinder to the working medium container.

15. The hydrodynamic retarder according to claim 3, wherein the wall comprises at least one opening in order to discharge working medium from the inlet cylinder to the working medium container.

16. The hydrodynamic retarder according to claim 4, wherein the wall comprises at least one opening in order to discharge working medium from the inlet cylinder to the working medium container.

17. A hydrodynamic retarder comprising:
a bladed rotor and a bladed stator jointly forming a working chamber configured to be filled with working medium and to be discharged therefrom;
a working medium container for receiving working medium that is currently not situated in the working chamber;
a control pressure application system for pressurizing the working medium contained in the working medium container with a control pressure medium to displace the working medium from the working medium container into the working chamber in order to set a desired braking torque;
wherein a centrifugal separator is provided for separating the working medium from the control pressure medium, wherein the centrifugal separator is connected in a flow-conductive manner to an outlet of the working medium container for the control pressure medium so as to be pressurized with the control pressure medium, wherein the centrifugal separator is driven by the pressure of the control pressure medium, and wherein the centrifugal separator is arranged above a liquid level of the working medium of the working medium container which is partly filled with control pressure medium and partly filled with working medium.

18. The hydrodynamic retarder according to claim 1, wherein the centrifugal separator is arranged above a liquid level of the working medium of the working medium container which is partly filled with control pressure medium and partly filled with working medium.

19. The hydrodynamic retarder according to claim 2, wherein the centrifugal separator is arranged above a liquid level of the working medium of the working medium container which is partly filled with control pressure medium and partly filled with working medium.

* * * * *